US012437943B2

(12) United States Patent
Krämer et al.

(10) Patent No.: US 12,437,943 B2
(45) Date of Patent: Oct. 7, 2025

(54) SHORT-CIRCUIT CURRENT LIMITER

(71) Applicant: Siemens Aktiengesellschaft, Munich (DE)

(72) Inventors: Hans-Peter Krämer, Erlangen (DE); Christian Schacherer, Deining (DE); Erik D Taylor, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 188 days.

(21) Appl. No.: 18/004,482

(22) PCT Filed: May 5, 2021

(86) PCT No.: PCT/EP2021/061861

§ 371 (c)(1),
(2) Date: Jan. 6, 2023

(87) PCT Pub. No.: WO2022/008118

PCT Pub. Date: Jan. 13, 2022

(65) Prior Publication Data

US 2023/0282431 A1 Sep. 7, 2023

(30) Foreign Application Priority Data

Jul. 6, 2020 (DE) ..................... 10 2020 208 426.2

(51) Int. Cl.
*H01H 33/664* (2006.01)

(52) U.S. Cl.
CPC ................................. *H01H 33/664* (2013.01)

(58) Field of Classification Search
CPC ............. H01H 33/664; H01H 33/6641; H01H 33/6642; H01H 33/16; H01H 9/106; H01H 9/10; H01H 9/542; H01H 2033/3078
USPC ................... 218/118, 123, 132, 133, 146, 46
See application file for complete search history.

(56) References Cited

U.S. PATENT DOCUMENTS 2,975,256 A 3/1961 Lee et al.
3,551,622 A * 12/1970 Takasuna .................. C22C 9/06 200/266
4,499,009 A * 2/1985 Yamanaka ........... H01H 1/0203 200/266
6,492,747 B1 * 12/2002 Hoffmann .............. H01H 9/106 337/5

(Continued)

FOREIGN PATENT DOCUMENTS

CH 451285 A 5/1968
DE 102017214238 A1 2/2019

(Continued)

OTHER PUBLICATIONS

Translation of EP3629352 (Original document published Apr. 1, 2020) (Year: 2020).*
Translation of DE102017214238 (Original document published Feb. 19, 2019) (Year: 2019).*
Vinaricky, Eduard: Kontaktwerkstoffe für die Mittel- und Hochspannungs-Energietechnik, EVU-Betriebspraxis Dec. 1995, p. 408-410; 1995.

(Continued)

*Primary Examiner* — William A Bolton
(74) *Attorney, Agent, or Firm* — Laurence A. Greenberg; Werner H. Stemer; Ralph E. Locher

(57) ABSTRACT

A short-circuit current limiter has a vacuum switch in a main current path and a current-limiting unit connected in parallel therewith in a commutation current path. The vacuum switch has switching contacts. A material of contact pieces of the switching contacts is selected such that a mean value of the chopping current is at least 8 amperes.

7 Claims, 1 Drawing Sheet

(56) References Cited

U.S. PATENT DOCUMENTS

| | | | | |
|---|---|---|---|---|
| 8,426,754 | B2 * | 4/2013 | Kikuchi | H01H 1/0206 200/269 |
| 8,837,093 | B2 * | 9/2014 | Panousis | H01H 33/75 361/13 |
| 9,875,861 | B2 * | 1/2018 | Ergin | H01H 9/548 |
| 10,096,443 | B2 * | 10/2018 | Jaenicke | H01H 33/596 |
| 10,490,365 | B2 * | 11/2019 | Heinz | H01H 9/547 |
| 2012/0218676 | A1 * | 8/2012 | Demetriades | H01H 9/542 361/115 |
| 2014/0005053 | A1 * | 1/2014 | Schacherer | H02H 9/023 505/211 |
| 2015/0108090 | A1 * | 4/2015 | Oates | H01H 33/12 218/10 |

FOREIGN PATENT DOCUMENTS

| | | | |
|---|---|---|---|
| EP | 3629352 | A1 | 4/2020 |
| GB | 1089049 | A | 11/1967 |
| WO | WO 2020064558 | A1 | 4/2020 |

OTHER PUBLICATIONS

Heitzinger, F.; Kippenberg, H.; Saeger, K. E.; Schröder, K.-H.: Contact Materials for Vacuum Switching Devices, XVth International Symposium on Discharges and Electrical Insulation in Vacuum, Darmstadt, 1992; 1992.

* cited by examiner

SHORT-CIRCUIT CURRENT LIMITER

The invention relates to a short-circuit current limiter as claimed.

In electrical circuits, in particular for medium-voltage and high-voltage energy supply, overcurrent events such as short circuits can arise that have a high damage potential.

$I_S$ limiters such as the $I_S$ limiter from ABB or the CLiP (=Current Limiting Protector) from G&W Electric are used to switch off a short-circuit current even before the first current maximum of the alternating current waveform. The principle of these devices is to switch off the short-circuit current rapidly in the event of a short circuit; this is achieved by separating the functions of normal operation and short-circuit current interruption. For normal operation there exists a main or rated current path, which can be opened rapidly in the event of a short circuit. In parallel with the main current path is a further current path, the commutation or parallel current path, containing a fuse, which can interrupt the short-circuit current.

A disadvantage of the $I_S$ limiters mentioned, which are based on pyrotechnical blowing-open of the main current path and commutation of the current from the main current path into the commutation current path, is that whenever the blown-open main current path is tripped, the pyrotechnic detonator and the fuse deployed in the commutation current path must afterwards be replaced, which involves time and effort, resulting in a prolonged interruption of the circuit.

This effort can be reduced by dispensing with a pyrotechnical blowing-open of the main current path. WO2020/064558A1 (Siemens AG) 2 Apr. 2020, for example, describes a short-circuit current limiter of this type, comprising an interrupter unit in the form of a vacuum switch in a main current path, and, connected in parallel therewith in a commutation current path, a current-limiting unit having an overcurrent protection element.

A vacuum switch as the interrupter unit in the main current path of a short-circuit current limiter of this type has two advantages compared with air or gas switching chambers such as those used in the $I_s$ limiter and CLiP: first, thanks to the high dielectric strength of the vacuum, a relatively short arc gap is already sufficient; second, the arc gap is restored more rapidly after the zero crossover; see, for instance, Vinaricky, Eduard, "Kontaktwerkstoffe für die Mittel- and Hochspannungs-Energietechnik, EVU-Betriebspraxis" ("Contact Materials for Medium-Voltage and High-Voltage Energy Technology, Operating Practice for Energy Supply Companies") (December 1995), p. 408-410.

Using a vacuum arc gap in the main current path, however, makes it more difficult to commutate the current from the main current path into the commutation current path and to interrupt the current in the main current path.

SUMMARY OF THE INVENTION

Therefore the object of the invention is to improve a short-circuit current limiter having an interrupter unit in the form of a vacuum switch in a main current path, and a current-limiting unit connected in parallel therewith in a commutation current path.

The object is achieved by a short-circuit current limiter as claimed in claim 1.

The short-circuit current limiter has a main current path and a commutation current path running in parallel with the main current path. The short-circuit current limiter can be used not just for limiting short circuits but for any type of overcurrent events, i.e. it is an apparatus for limiting the current level during an overcurrent event, for instance a short circuit, in order to avoid damage to an electrical power distribution grid, in particular to the electrical power lines of the electrical power distribution grid, and/or to devices and machines connected thereto, as a result of too high a current, what is known as the overcurrent.

Arranged in the main current path is an interrupter unit, which is in the form of a vacuum switch. A vacuum switch has an evacuated space, known as a vacuum switching chamber, in which is located an electrical switch having switching contacts. Unlike gas-insulated switches, vacuum switches interrupt the arc in a vacuum switching tube, which is also referred to as a vacuum switching chamber. The hermetically sealed vacuum switching tubes are generally maintenance-free and unaffected by environmental influences. Oxidation does not take place in the vacuum, with the result that the switching contacts remain permanently pure, thereby ensuring a constant switching behavior.

Arranged in the commutation current path is a current-limiting unit. The current-limiting unit can be embodied as overcurrent protection, for instance as a fuse.

The material of contact pieces of the switching contacts of the vacuum switch is selected such that the mean value of the chopping current is at least 8 amperes. Different measured values scattered about a mean value are obtained in a plurality of measurements of the chopping current for a specific configuration of a short-circuit current limiter having a vacuum switch in a main current path and a current-limiting unit connected in parallel therewith in a commutation current path.

The invention is based on the finding that a high chopping current, i.e. a chopping current having a mean value of at least 8 amperes, in an overcurrent limiter according to the preamble, i.e. a switching device having a vacuum switch arranged in a main current path and having a parallel commutation path, assists the current commutation and/or the current interruption in the main current path. According to the invention, the material of contact pieces of the switching contacts is selected such that the mean value of the chopping current is at least 8 amperes; there are no limits here to higher values, but instead the higher the mean value of the chopping current the better. This is surprising in that in the case of simple vacuum switches, i.e. vacuum switches without a parallel commutation path, care is taken to ensure that the chopping current is as low as possible, i.e. at a few amperes, preferably lying in a range of 2 to 3 amperes, at most 6 amperes; see, for example, Vinaricky, Eduard, "Kontaktwerkstoffe für die Mittel- and Hochspannungs-Energietechnik, EVU-Betriebspraxis" (December 1995), p. 408-410; and Heitzinger, F.; Kippenberg, H.; Saeger, K. E.; Schröder, K.-H., Contact Materials for Vacuum Switching Devices, XVth International Symposium on Discharges and Electrical Insulation in Vacuum, (Darmstadt, 1992). The reason for seeking a low chopping current in simple vacuum switches is that when switching inductances, the aim is to avoid or minimize induction of overvoltages caused by the abrupt current chopping shortly before the current zero crossover, in particular in the case of low switching currents. With regard to the requirements placed on the chopping current, the invention thus differs fundamentally from the simple vacuum switches. A high chopping current, which in simple vacuum switches would induce unwanted overvoltages, does not lead to damaging overvoltages in the grid in the case of the invention by virtue of the parallel commutation path.

According to a preferred development of the invention, the material of the contact pieces of the switching contacts is selected such that the mean value of the chopping current is at least 10 amperes. The higher the mean value of the chopping current, the more reliably is performed the current commutation and/or the current interruption in the main current path.

According to a preferred development of the invention, the contact pieces of the switching contacts are made of one of the following materials:

- Pure metals in general, in particular copper Cu, tungsten W, chromium Cr, nickel Ni, molybdenum Mo, titanium Ti, zirconium Zr. Using contact pieces made of pure copper results in a chopping current of 15 amperes. Using contact pieces made of pure tungsten results in a chopping current of 14 to 50 amperes.
- Alloys such as a copper-bismuth alloy Cu/Bi; a tungsten-copper-lithium alloy W/Cu/Li 69.76/30/0.24 (figures are percentages by mass). Using contact pieces made of a copper-bismuth alloy results in a chopping current of up to 21 amperes. Using contact pieces made of the tungstencopper-lithium alloy W/Cu/Li 69.76/30/0.24 results in a chopping current of 22.1 amperes.
- Further suitable materials are standard contact materials such as copper-chromium CuCr with additives of 0.1 to 20 percent by weight of other materials that increase the chopping current, for instance materials such as tungsten W, nickel Ni, molybdenum Mo, titanium Ti, zirconium Zr.
- Further information on suitable materials having a chopping current of greater than 10 amperes is given in Chapter 3 of the following monograph: Paul G. Slade, The Vacuum Interrupter: Theory, Design, and Application (2008) CRC Press, Taylor & Francis Group, Boca Raton, ISBN 978-0-8493-9091-3.

The above-described properties, features and advantages of this invention and the manner in which they are achieved become more clearly and distinctly comprehensible by way of the following description of the drawings. In the drawings, in a schematic illustration that is not true to scale:

DETAILED DESCRIPTION OF THE INVENTION

Figure 1:
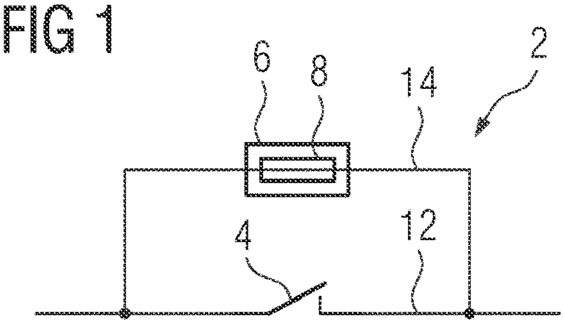
FIG. 1 shows a short-circuit current limiter.

FIG. 1 shows a short-circuit current limiter 2. This comprises a rated current path 12, which can be interrupted by an interrupter unit 4. The interrupter unit 4 is a vacuum switch. In addition, the current limiter 2 has a parallel current path 14, in which is arranged a current-limiting unit 6, which mainly comprises an overcurrent protection element 8, preferably in the form of a fuse. In the event of a short circuit, the rated current path 12 is opened by means of the vacuum switch 4, producing an arc in the process. The arc voltage brings about complete commutation of the current into the parallel current path 14 containing the overcurrent protection element 8, whereat the arc is extinguished and the overcurrent protection element 8 starts to fuse. The overcurrent protection element 8 does not start the current limiting until the rated current path 12 is definitely isolated by the interrupter unit 4. In order that the commutation from the rated current path 12 into the parallel current path 14 can take place, the impedances of the parallel current path 14 and the rated current path 12 must be matched to one another. A further challenge when selecting the overcurrent protection element 8 and the resultant impedance is to prevent the current that flows through the overcurrent protection element 8 from getting too high in rated operation, hence preventing the overcurrent protection element 8 from being destroyed by fusing already during rated operation. This gives rise to a trade-off between as high an impedance as possible in the parallel current path 14 relative to the rated current path 12 so as not to overload the overcurrent protection 8, and as low an impedance as possible relative to the rated current path 12 in the event of a short circuit occurring, in order to get the current to commute into the parallel current path 14.

Figure 2:
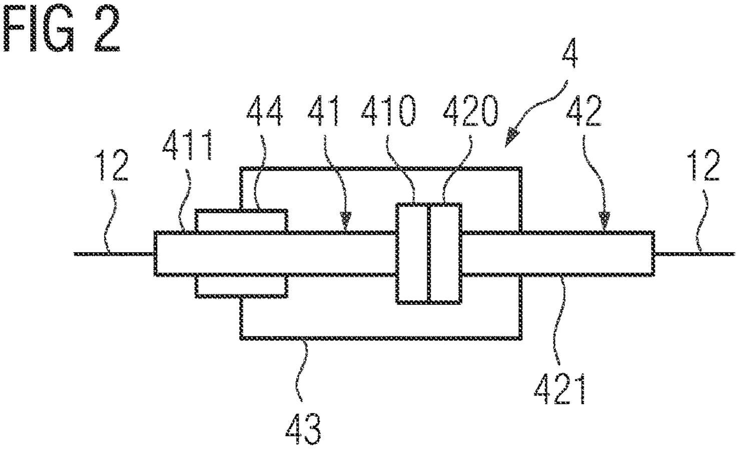
FIG. 2 shows the design of the vacuum switch illustrated in FIG. 1 with closed contact-position.

FIG. 2 shows the schematic design of the vacuum switch 4 illustrated in FIG. 1, with closed contact-position. A switching contact 41, which is slidably mounted in a hermetic bearing arrangement 44, for instance a sliding bearing, and a fixed switching contact 42 lie coaxially opposite one another in a vacuum enclosure 43. The moveable switching contact 41 is electrically connected to an electrical conductor of the rated current path 12. The fixed switching contact 42 is likewise electrically connected to the electrical conductor of the rated current path 12. The switching contacts 41, 42 have schematically represented contact pieces 410 and 420, which, in the exemplary embodiment shown, have a larger diameter than the respectively adjoining connecting studs 411 and 421, which penetrate the vacuum enclosure 43 hermetically. The contact pieces 410 and 420 can also have the same or a smaller diameter than the respectively adjoining connecting studs 411 and 421. The connecting studs 411 and 421 are electrically connected outside the vacuum enclosure 43 to the rated current path 12 in such a way that the vacuum switch 4 allows a current flow through the rated current path 12 for the closed contact-position, and the vacuum switch 4 interrupts the rated current path 12 for the open contact-position.

Figure 3:
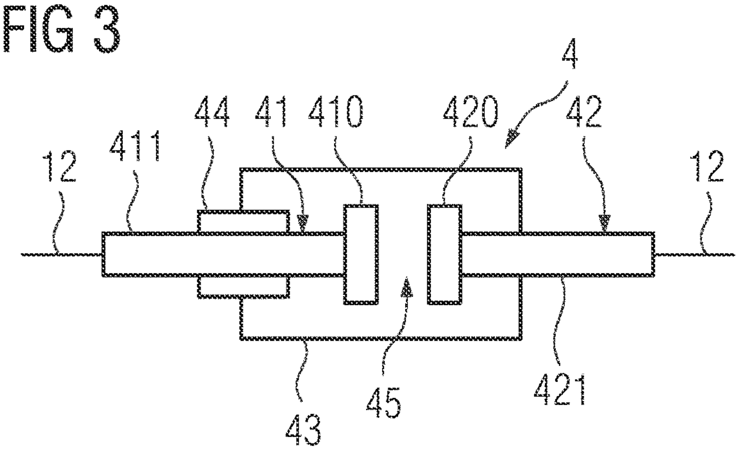
FIG. 3 shows the vacuum switch of FIG. 2 with open contact-position.

FIG. 3 shows the vacuum switch of FIG. 2 with open contact-position. After detection of an overcurrent, the moveable switching contact 41 has been moved by a drive (not shown) from the closed contact-position shown in FIG. 2 into the open contact-position shown in FIG. 3, in which position an arc gap 45 separates the two contact pieces 410 and 420 from one another.

According to the invention, the material of the contact pieces 410, 420 of the switching contacts 41, 42 is selected such that the chopping current between the two contact pieces 410 and 420 is greater than 8 amperes, in an advantageous development greater than 10 amperes. For example, the material of the contact pieces 410 and 420 is selected as a tungsten-copper-lithium alloy having a mixing ratio W/Cu/Li 69.76/30/0.24 percent by weight.

Unlike conventional vacuum switches, in the present short-circuit current limiter, a chopping current greater than 8 or 10 amperes assists the current commutation and/or the current interruption in the main current path 12. The induced overvoltages that arise in conventional applications do not lead to damaging overvoltages in the grid in this application by virtue of the parallel commutation path 14.

The invention claimed is:

1. A short-circuit current limiter, comprising:

a vacuum switch with switching contacts connected in a main current path;

a current-limiting unit connected in parallel with said vacuum switch in a commutation current path;

said switching contacts having contact pieces formed with a material selected such that a mean value of a chopping current is at least 8 amperes.

2. The short-circuit current limiter according to claim 1, wherein the material of said contact pieces of said switching contacts is selected such that the mean value of the chopping current is at least 10 amperes.

3. The short-circuit current limiter according to claim 1, wherein the material of said contact pieces of said switching contacts is a pure metal.

4. The short-circuit current limiter according to claim 3, wherein the material of said contact pieces is a metal selected from the group consisting of copper, tungsten, chromium, nickel, molybdenum, titanium, and zirconium.

5. The short-circuit current limiter according to claim 1, wherein the material of said contact pieces of said switching contacts is selected from the group consisting of a copper-bismuth alloy and a tungsten-copper-lithium alloy in a ratio of 69.76/30/0.24 in mass percent.

6. The short-circuit current limiter according to claim 1, wherein the material of said contact pieces of said switching contacts is a copper-chromium composite with additives of 0.1 to 20 percent by weight of additional materials configured to increase the chopping current.

7. The short-circuit current limiter according to claim 6, wherein the additional materials are metals selected from the group consisting of tungsten, nickel, molybdenum, titanium, and zirconium.

* * * * *